US012042918B2

(12) United States Patent
Schmollngruber et al.

(10) Patent No.: US 12,042,918 B2
(45) Date of Patent: Jul. 23, 2024

(54) HYDRAULIC UNIT FOR HYDRAULIC RESCUE TOOLS, AND RESCUE TOOL EQUIPPED THEREWITH

(71) Applicant: WEBER-HYDRAULIK GMBH, Losenstein (AT)

(72) Inventors: Johann Schmollngruber, Grossraming (AT); Dominik Steinparzer, Steyr (AT)

(73) Assignee: WEBER-HYDRAULIK GMBH, Losenstein (AT)

(*) Notice: Subject to any disclaimer, the term of this patent is extended or adjusted under 35 U.S.C. 154(b) by 0 days.

(21) Appl. No.: 18/122,854

(22) Filed: Mar. 17, 2023

(65) Prior Publication Data

US 2023/0219208 A1 Jul. 13, 2023

Related U.S. Application Data

(63) Continuation of application No. 17/590,281, filed on Feb. 1, 2022, now Pat. No. 11,738,440, which is a
(Continued)

(30) Foreign Application Priority Data

Jun. 12, 2017 (AT) .................................. 50489/2017

(51) Int. Cl.
*B25F 5/00* (2006.01)
*A62B 3/00* (2006.01)
(Continued)

(52) U.S. Cl.
CPC .............. *B25F 5/005* (2013.01); *A62B 3/005* (2013.01); *B25B 28/00* (2013.01); *F04B 17/03* (2013.01);
(Continued)

(58) Field of Classification Search
CPC ........... A62B 3/00; A62B 3/005; B25F 5/005; B25B 28/00
See application file for complete search history.

(56) References Cited

U.S. PATENT DOCUMENTS 4,235,595 A 11/1980 Arnegger
4,392,263 A 7/1983 Amoroso
(Continued)

FOREIGN PATENT DOCUMENTS

CN 2011 22889 Y 9/2008
CN 102581821 A 7/2012
(Continued)

OTHER PUBLICATIONS

International Search Report in PCT/AT2018/060118, mailed Nov. 6, 2018.
(Continued)

*Primary Examiner* — Tyrone V Hall, Jr.
(74) *Attorney, Agent, or Firm* — Collard & Roe, P.C.

(57) ABSTRACT

A portable, battery-powered hydraulic unit for hydraulic rescue tools, in particular for spreading or cutting tools, as well as a rescue tool equipped therewith, are disclosed. The hydraulic unit includes at least one hydraulic pump, a hydraulic tank, a compensation device for hydraulic fluid, a manually operated hydraulic control valve, an electromechanical interface for on-demand coupling and decoupling of at least one battery pack, a mechanical-hydraulic interface for connecting a hydraulic tool, and an electric motor operable by the electrical energy of the battery pack for driving the hydraulic pump. The electric motor is formed by a disc-shaped motor whose axial length extending in parallel to the longitudinal axis of its output shaft is shorter than its outer diameter.

20 Claims, 5 Drawing Sheets

Related U.S. Application Data continuation of application No. 16/613,964, filed as application No. PCT/AT2018/060118 on Jun. 7, 2018, now Pat. No. 11,273,547.

(51) Int. Cl.

| | |
|---|---|
| ***B25B 28/00*** | (2006.01) |
| ***F04B 17/03*** | (2006.01) |
| ***F15B 1/26*** | (2006.01) |
| ***F15B 11/08*** | (2006.01) |
| ***F15B 15/18*** | (2006.01) |

(52) U.S. Cl.

CPC ................ *F15B 1/26* (2013.01); *F15B 11/08* (2013.01); *F15B 15/18* (2013.01)

(56) References Cited

U.S. PATENT DOCUMENTS

| | | | | |
|---|---|---|---|---|
| 5,243,761 | A | 9/1993 | Sullivan et al. | |
| 5,272,811 | A | 12/1993 | Armand | |
| 5,360,322 | A | 11/1994 | Henein et al. | |
| 8,276,430 | B2 | 10/2012 | Barezzani et al. | |
| 10,293,192 | B2 | 5/2019 | Horne et al. | |
| 2005/0120770 | A1 | 6/2005 | Frenken | |
| 2006/0245956 | A1 | 11/2006 | Lacroix et al. | |
| 2007/0046131 | A1 | 3/2007 | Boebel et al. | |
| 2014/0033149 | A1 | 1/2014 | Groves et al. | |
| 2014/0034149 | A1 * | 2/2014 | Kimura ................... | F16L 37/32 137/315.01 |
| 2014/0182874 | A1 | 7/2014 | Barezzani et al. | |
| 2015/0364889 | A1 | 12/2015 | Frenken | |
| 2017/0057040 | A1 | 3/2017 | Rzasa et al. | |
| 2017/0252912 | A1 | 9/2017 | Barezzani | |
| 2017/0266791 | A1 | 9/2017 | Barezzani et al. | |
| 2020/0254600 | A1 | 8/2020 | Kamijo | |

FOREIGN PATENT DOCUMENTS

| | | | |
|---|---|---|---|
| CN | 102882340 | A | 1/2013 |
| CN | 206743045 | U | 12/2017 |
| DE | 43 02 042 | A1 | 7/1994 |
| DE | 295 14 768 | U1 | 11/1995 |
| DE | 692 21 221 | T2 | 11/1997 |
| DE | 101 24 267 | A1 | 11/2002 |
| DE | 20 2006 001 889 | U1 | 3/2007 |
| DE | 10 2007 047 757 | A1 | 4/2009 |
| DE | 10 2015 208 281 | A1 | 11/2016 |
| EP | 0 783 395 | B1 | 9/1998 |
| EP | 1 480 321 | A1 | 11/2004 |
| EP | 1 759 987 | A2 | 3/2007 |
| EP | 2 532 480 | A2 | 12/2012 |
| FR | 2 724 422 | A1 | 3/1996 |
| IN | 1264952 | A | 8/2000 |
| JP | 2000-343448 | A | 12/2000 |
| JP | 2002-254342 | A | 9/2002 |
| RU | 2039643 | C1 | 7/1995 |
| RU | 2238178 | C2 | 10/2004 |
| RU | 2421325 | C2 | 6/2011 |
| WO | 2008/032341 | A1 | 3/2008 |
| WO | 2015/186301 | A1 | 12/2015 |
| WO | 2016/119819 | A1 | 8/2016 |
| WO | 2016/166321 | A1 | 10/2016 |

OTHER PUBLICATIONS

Wolfgang Gerke: "Elektrische Maschinen und Aktoren: Eine anwendungsorientierte Einführung", Dec. 4, 2012, pp. 194-198, with English Summary.

D5: Rolf Fischer, "Elektrische Maschinen", 17. Auflage 2017, ISBN 978-3-446-45218-3, pp. 50-54.

D6: Behrends, "Elektrische Maschinen", Vogel Buchverlag, 2011, ISBN 978-3-8343-3190-8, pp. 113-116, with English concise explanation.

D12: http://hacker-industrial-solutions.com/elektro-antriebssystem/q-150-brushless-dc-motorenserie/; Auszug aus internetarchiv Wayback-Maschine vom 21.10.2016, 10 pages, with English concise explanation.

D12a: HIS-Magazin Ausgabe Q1 .2017, 4 pages, with English concise explanation.

D12b: Katalog "Hacker Brushless Motors Programm 2016" der Hacker Motor GmbH, 88 pages, with English concise explanation.

D12c: https://vwvvv.rc-network.de/threads/q80-von-hacker-testerfahrungenmess . . . 1 „Q80 von Hacker—Testerfahrungen (Messestand) vom 9.11.2010, 9 pages, with English concise explanation.

D13: Sparsam stapeln und transportieren", Ke Next, „Konstruktion & Engineering—Das Zukunftsmagazin für den Maschinen—und Anlagenbau", Ausgabe Nov. 12, 2015, pp. 24-27, with English concise explanation.

D13a: Auszug aus WaybackMachine vom 15.08.2016; http://vwvvv.sonceboz.com/en/Compact-power-BLDC/, 26 pages.

D14: Heinzmann, "Elektrische Antriebe—Produktkatalog" ED_CAT_001_16_11_d_1_2016, 56 pages, with English concise explanation.

Defendant Hurst Jaws of Life, Inc.'s Answer, Affirmative Defenses, and Counterclaims To Plaintiff's Complaint, Case 1:22-cv-00219-MR (W.D.N.C.), Apr. 10, 2023, total of 41 pages.

Defendant Idex Corporation's Answer, Affirmative Defenses, and Counterclaims To Plaintiff's Complaint, Case 1:22-cv-00219-MR (W.D.N.C.), Apr. 10, 2023, total of 42 pages.

Budig, Peter-Klaus—„Technik-Wörterbuch Elektrotechnik—Elektronik Deutsch-Englisch, VEB Verlag Technik Berlin, 1988, p. 25, total of 3 pages.

Kleimaier et al., "Axial flux motor "DYNAX®"—A compact electric drive for automotive power trains", 2011 IEEE, pp. 1-4, XP93077271A.

* cited by examiner

HYDRAULIC UNIT FOR HYDRAULIC RESCUE TOOLS, AND RESCUE TOOL EQUIPPED THEREWITH

CROSS REFERENCE TO RELATED APPLICATIONS

This application is a continuation of and Applicant claims priority under 35 U.S.C. § 120 of U.S. patent application Ser. No. 17/590,281 filed on Feb. 1, 2022, which is a continuation of U.S. patent application Ser. No. 16/613,964 filed on Nov. 15, 2019, now U.S. Pat. No. 11,273,547 issued Mar. 15, 2022, which application is a national stage application under 35 U.S.C. § 371 of PCT Application No. PCT/AT2018/060118 filed on Jun. 7, 2018, which claims priority under 35 U.S.C. § 119 of Austrian Application No. A 50489/2017 filed on Jun. 12, 2017, the disclosures of each of which are hereby incorporated by reference. A certified copy of priority Austrian Patent Application No. A 50489/2017 is contained in grandparent U.S. patent application Ser. No. 16/613,964. The International Application under PCT article 21(2) was not published in English.

BACKGROUND OF THE INVENTION

1. Field of the Invention

The invention relates to a portable, battery-powered hydraulic unit for hydraulic rescue tools, in particular for spreading or cutting tools, as well as a rescue tool equipped with such a hydraulic unit, as indicated in the claims.

2. Description of the Related Art

Hydraulic rescue tools are known in particular as spreading or cutting tools and are typically used by rescue organizations, such as the fire department or the technical support service, but are also used by special ops forces. In order to achieve a rapid operational readiness of such rescue or emergency tools, it is endeavored to design these technical aids portable and thus to implement them as lightweight as possible. To enable an operation autonomous from power generators or power supply networks, the hydraulic units for activating the hydraulic rescue tools have been increasingly made operable by electrochemical energy storages, in particular by accumulators. Generic battery-operated hydraulic units for hydraulic rescue tools, which hydraulic units are to be portable or operable by only one person, are available from the applicant in a plurality of designs. The respective hydraulically actuated tools are permanently fastened to or mounted on the portable, battery-powered hydraulic unit. The corresponding rescue tool can be operated and appropriately utilized by only one person using ergonomically appropriate handles or grip sections.

The basic technical structure of a generic, previously known rescue tool is also disclosed, for example, in WO 2016/119819 A1.

The present invention has for its object to provide an improved hydraulic rescue tool, in particular to further optimize its handling and still achieve the highest possible performance.

SUMMARY OF THE INVENTION

This object of the invention is achieved by a generic hydraulic unit with the characterizing features disclosed herein, and by a rescue tool disclosed herein.

Due to the fact that the electric motor of the portable, battery-operated hydraulic unit is formed by a disc-shaped motor whose axial length extending parallel to the longitudinal axis of its output shaft is shorter than its outer diameter, a relatively compact hydraulic unit, in particular of relatively short construction with respect to its longitudinal extension, and thus a rescue tool of ultimately relatively short construction, can be created. Due to the fact that the rescue tool can have all in all a relatively short overall length, since at least the hydraulic unit that is flanged or firmly coupled to it can have a relatively short length, it is possible to use the rescue tool even in confined locations. Such confined locations can exist, for example, between the body pillars of a passenger car. Other work locations where space is at a premium can also be better handled by a rescue tool with the shortest possible construction. A particular advantage of the inventive measures is that the disc-shaped motor for driving the hydraulic pump has a favorable power-to-weight ratio, i.e. a relatively low mass at a certain drive power. This is particularly advantageous in connection with the simplest possible portability and ergonomics of the rescue tool. For example, rescue operations or other assignments can be carried out as quickly and effortlessly as possible.

Another advantage of the measures according to the invention lies in an improved, structural assignability to the hydraulic components of the hydraulic unit, in particular in relation to the hydraulic tank or hydraulic pump. In particular, an optimized structural interaction or grouping can be achieved between the mentioned hydraulic components and the electric drive of the mobile or portable hydraulic units formed by a disc-shaped motor.

In accordance with an appropriate embodiment, the disc-shaped motor is designed as an external-rotor motor with an internal fixed stator and an external rotationally movable rotor. The output shaft of this disc-shaped motor, which is designed on the rotor, passes through the stator in the axial direction of the output shaft. Accordingly, the outer shell or sub-section of the disc-shaped motor is rotationally movable or designed as a rotor. Since this drive motor is arranged inside a housing of the hydraulic unit, there is no risk of contact and the risk of braking or grinding objects can be virtually eliminated. In addition, a mechanically improved fastening of this drive motor is possible because the rotating section occupies only a portion of the outer surface, in particular at least the shell surface and one of the front end surfaces of the disc-shaped motor. The disc-shaped motor can therefore be adapted in terms of its mechanical mounting interface in a relatively simple manner specifically to its mounting counterpart, in particular to the characteristics of the hydraulic tank and the hydraulic pump.

The disc-shaped motor can be formed as a so-called bell rotor motor with a bell-shaped rotor. An optimized power-to-weight ratio of the disc-shaped motor can be achieved by the bell-shaped or in cross-section essentially U-shaped rotor, which at least partially delimits the essentially disc-shaped or likewise approximately bell-shaped stator. In particular, this makes it possible to achieve an optimum ratio between performance and total mass, which is particularly advantageous in connection with portable rescue tools or in relation to the portable hydraulic units required for this purpose.

According to a practical embodiment, it is provided that a plurality of distributed permanent magnets is designed in relation to the circumference of the rotor, which permanent magnets interact with coil windings on the stator. These coil windings on the stator are provided for generating electromagnetic rotating fields. The generated electromagnetic rotating fields are preferably determined or controllably generated by an electronic commutation circuit. This makes it possible to design the drive motor of the hydraulic unit and the rescue tool brushless, that is, without electrical sliding contacts. Thus, a relatively low maintenance and a total freedom from maintenance of the rescue tool or its hydraulic unit can be achieved. In an advantageous manner, this also achieves a comparatively high functional reliability or availability of the rescue device, which is of particular importance in connection with time-critical rescue operations in which high functional reliability or availability of tools is of eminent importance.

According to an advantageous embodiment it is provided that the disc-shaped motor is directly attached on the housing of the hydraulic tank, in particular on a boundary wall or on a cover of the hydraulic tank. This also makes it possible to achieve a weight-optimized design of the hydraulic unit or of the rescue tool. In particular, it is not required that special mounting flanges or an intermediate adapter for holding the electric drive is needed. The direct attachment of the disc-shaped motor on the hydraulic tank thus also favors the compactness and mechanical robustness of the hydraulic unit. In interaction with the hydraulic tank, the disc-shaped motor offers particular application advantages, since the relatively large end face of the disc-shaped motor can substitute relatively large sections of the hydraulic tank, thereby enabling the achievement of relevant or significant weight savings.

In particular, it may be appropriate if the first end wall of the disc-shaped motor, which is closest to the output shaft or to the output stub of the disc-shaped motor, is firmly screwed to the housing of the hydraulic tank via a number of fastening screws. The housing of the hydraulic tank usually offers a high mechanical stability in order to accommodate the disc-shaped motor in a sufficiently stable or torsion-free manner in the outer housing of the entire hydraulic unit, which is typically formed from injection-molded plastic.

According to an appropriate development, it can be provided that the screwed connection between the disc-shaped motor and the housing of the hydraulic tank is attached or constructed starting from the second end wall of the disc-shaped motor opposite the first end wall. Consequently, the screw heads of fastening screws for fastening the disc-shaped motor to the hydraulic tank are then arranged on the inside of its first end wall facing the interior of the disc-shaped motor. As a result, a high-strength, yet practicable connection between the disc-shaped motor and the hydraulic tank is realized. In particular, the hydraulic tank can thereby be already designed closed in itself and then the disc-shaped motor can be screwed from the outside on the hydraulic tank by a plurality of fastening screws, wherein the fastening screws are inserted through the disc-shaped motor and ultimately abut on the screw head on the inside of the first end wall, in particular on the stator boundary wall. It is necessary to open up the housing of the hydraulic tank for mounting or disassembly of the given disc-shaped motor. In addition, a design of the hydraulic unit that is particularly weight-optimized and minimized in terms of the number of required components is achieved by the specified measures.

In order to enable a screw connection of the disc-shaped motor via the inside thereof or via its interior, it is appropriate for the second end wall of the disc-shaped motor opposite the first end wall, to be a constituent of the rotor, the second end wall having at least two breakthroughs or cutouts enabling the fastening screws to be inserted or screwed in starting from the second end wall in parallel direction of the output shaft of the disc-shaped motor, the individual fastening screws being moved via the interior of the disc-shaped motor towards the inside of the first end wall of the disc-shaped motor. As a result, the screw heads of the fastening screws are attached quasi in the interior of the electric motor and a screw connection of the disc-shaped motor is carried out advantageously such that attachment takes place via its interior. This also makes it possible to achieve the simplest possible construction, the lowest possible weight and/or a relatively compact construction arrangement. In addition, it is thereby not necessary to provide the screw connection of the electric motor with respect to the hydraulic tank starting from the interior of the hydraulic tank, the hydraulic tank having to reliably meet certain tightness requirements. In particular, the threaded portions of the fastening screws facing away from the screw heads are thereby nearest assigned to the hydraulic tank and their screw heads abut on the inside of the first end wall of the disc-shaped motor. A screw connection starting from the hydraulic tank, which must comply with enhanced tightness requirements or which should not be opened if possible, can thus be omitted in a practicable manner.

According to an appropriate measure, it is provided that the hydraulic tank is arranged between the disc-shaped motor and the hydraulic pump and a connecting shaft is provided which passes through a cutout, in particular a cavity or bypass channel that is free of hydraulic fluid, in the hydraulic tank and which connecting shaft rotatably couples the disc-shaped motor and the hydraulic pump. As a result, a block or row arrangement of disc-shaped motor, hydraulic tank and hydraulic pump is practically created, wherein the connecting shaft between the disc-shaped motor and the hydraulic pump passes through the hydraulic tank. In particular, the disc-shaped motor on one hand and the hydraulic pump on the other hand are arranged in relation to two opposite sides of the hydraulic tank. Therefore, the hydraulic tank is advantageously positioned between the mentioned components. This results in a technically practical basic structure that is as compact as possible in terms of construction and sufficiently stable mechanically or statically.

It is appropriate if the compensation device for the volume changes of the amount of hydraulic fluid present in each hydraulic tank comprises an elastically resilient or elastically adjustable compensation diaphragm which is disposed within the hydraulic tank and is movable relative to the interior of the hydraulic tank. Because this compensation device is preferably formed from an elastomeric material, for example from a rubber membrane, it is to be protected with regard to sharp edges or transitions. Since no screw heads are provided to fasten the disc-shaped motor within the hydraulic tank, a good protection for such a compensation membrane is basically created. In particular, it can be ensured by the above-mentioned screw fastening of the disc-shaped motor relative to the hydraulic tank, that the compensation membrane is reliably protected against sharp-edged transitions and against gradual damage.

According to an advantageous embodiment, it may be provided that at least a sub-section of the first end wall of the disc-shaped motor forms a structural boundary section at the same time, possibly even a liquid-tight boundary or housing section of the hydraulic tank or the compensation device. In particular, at least one sub-section of the housing of the hydraulic tank can be formed by a boundary wall, in particular by the end wall of the disc-shaped motor, which is closest to the output shaft. This also allows for the achievement of weight saving or a reduction of the required components of the hydraulic unit. In particular, a weight saving is achieved such that at least sub-sections of the hydraulic tank are formed by housing or wall sections of the disc-shaped motor. In particular, a weight saving can be achieved by omitting at least sub-sections of the nearest assigned housing wall of the hydraulic tank.

Finally, the object of the invention is also achieved by a hydraulic rescue tool in accordance with the measures disclosed herein. The achievable advantages and technical effects can be found in the preceding and the following parts of the description.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

Figure 1:
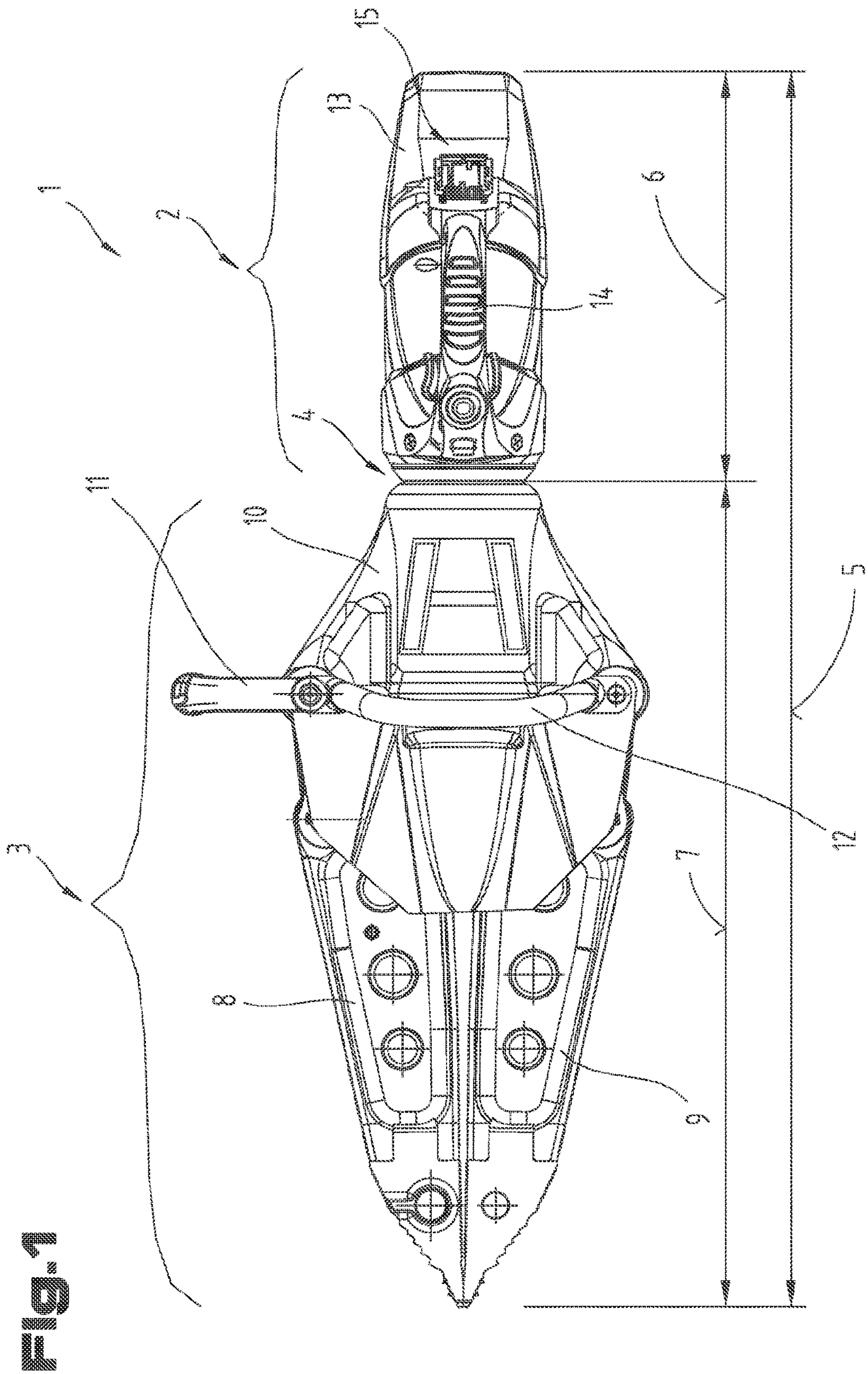

Each shows in a simplified, schematic representation:

FIG. 1 shows an embodiment of a hydraulic rescue tool in plan view.

Figure 2:
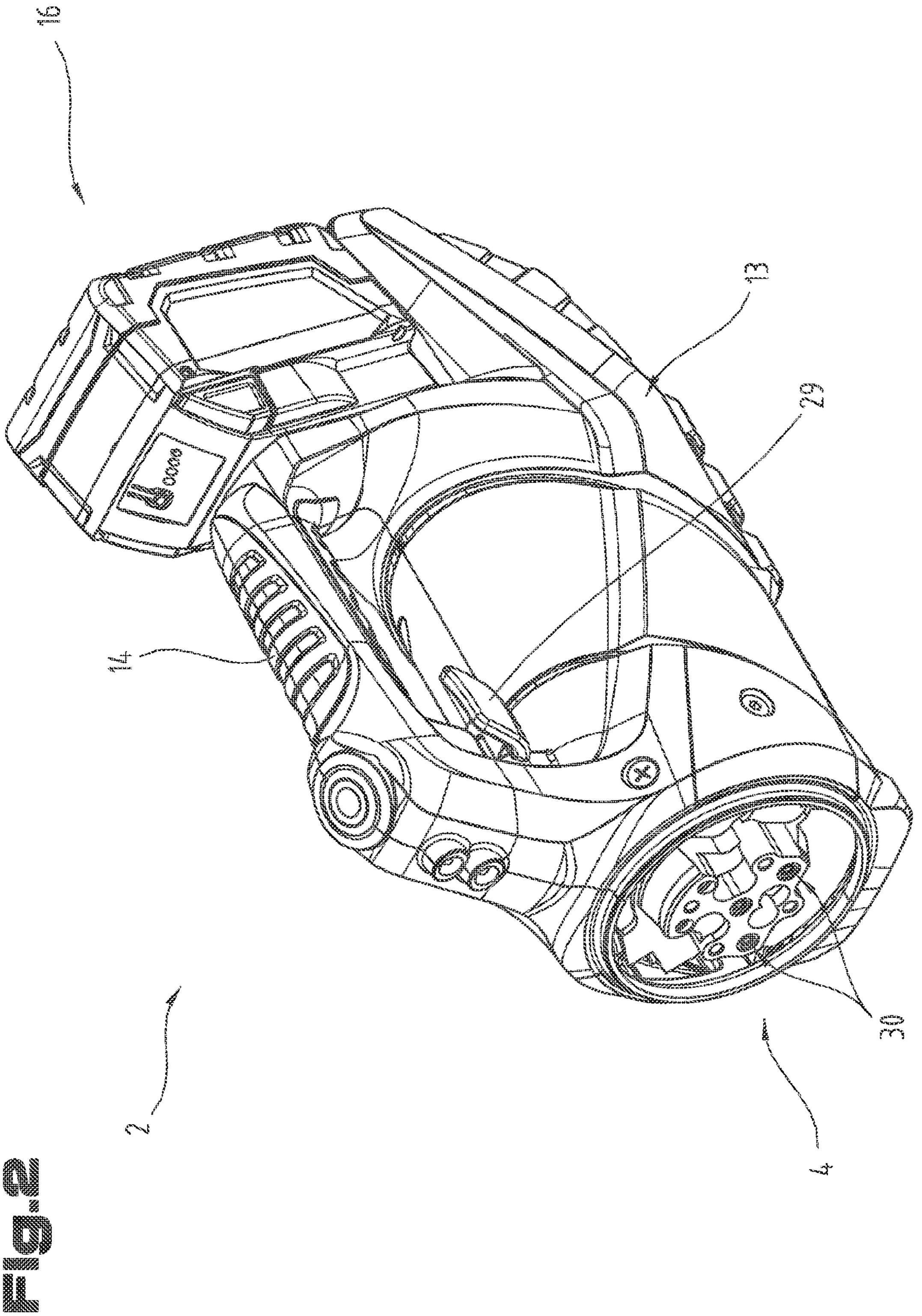
Figure 3:
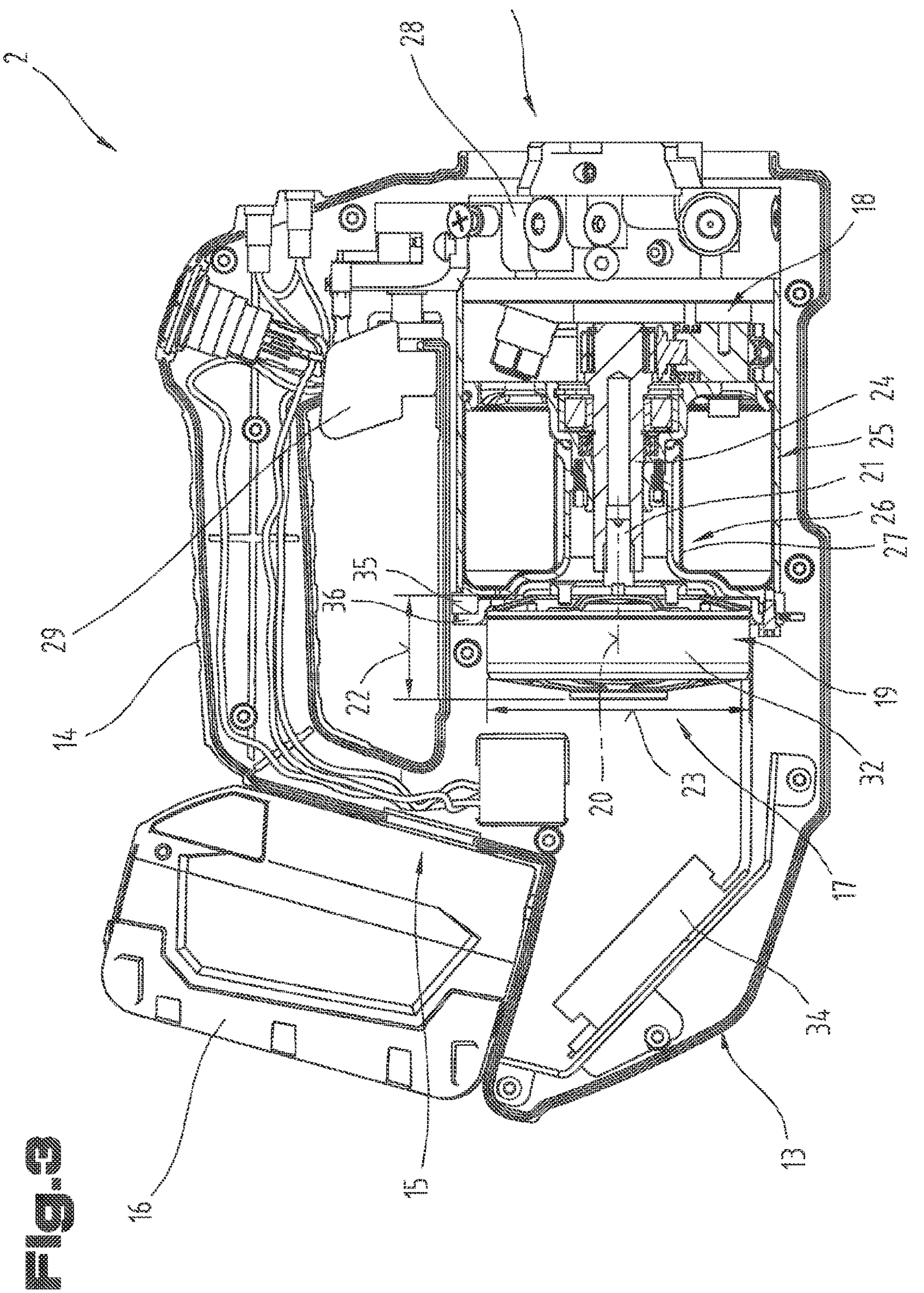
Figure 5:
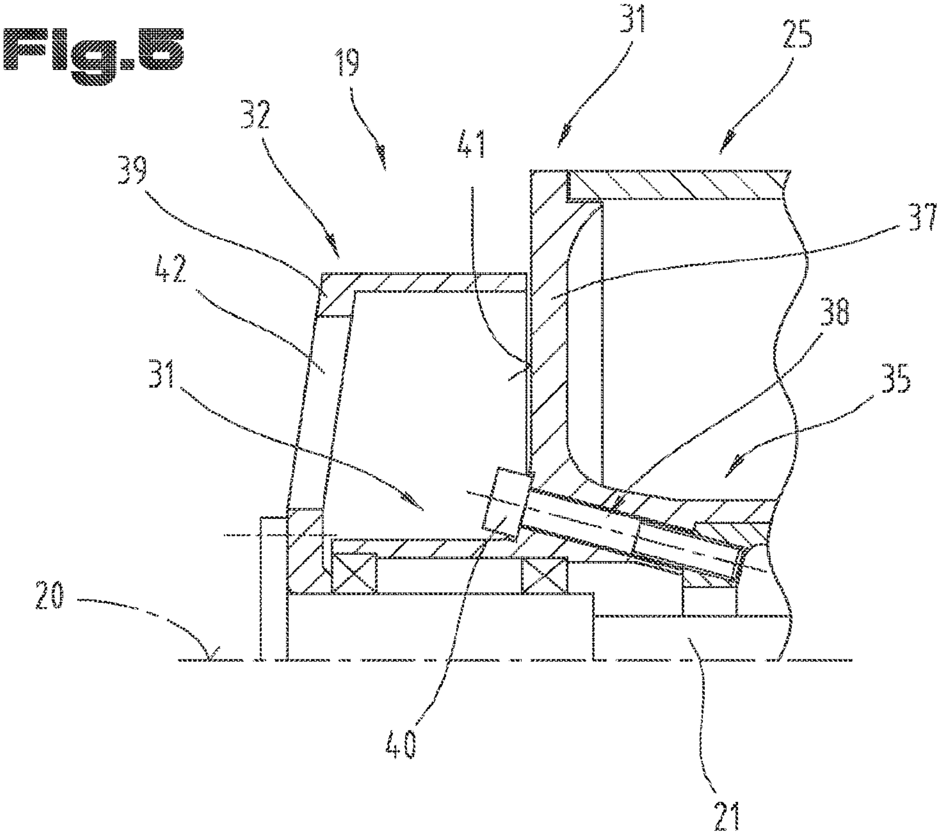
Figure 6:
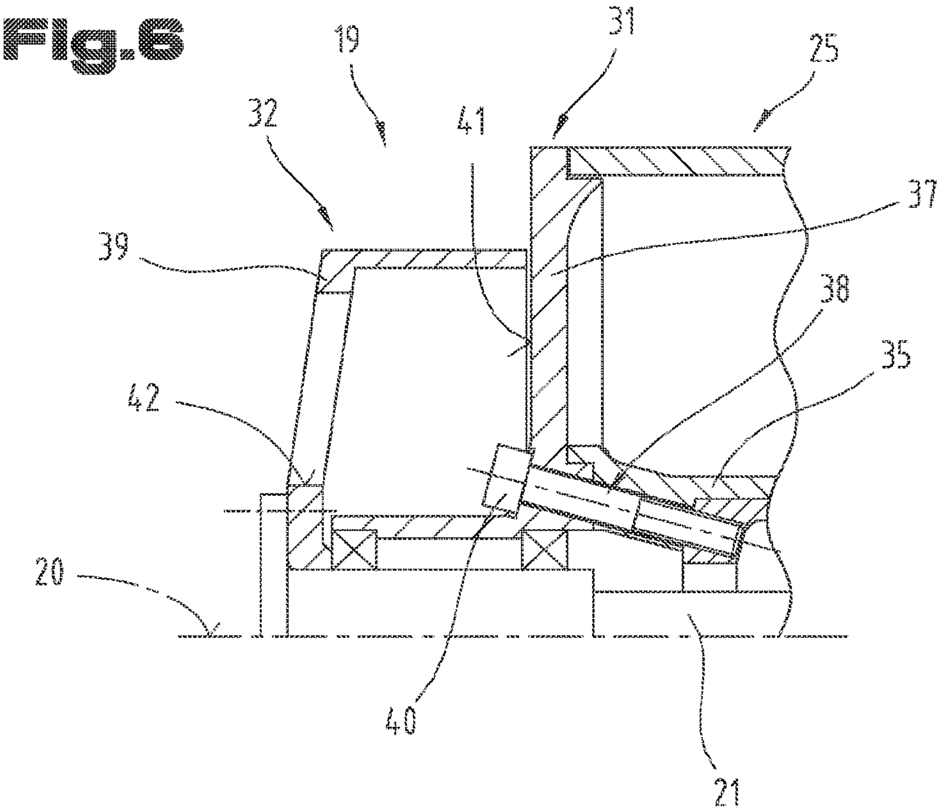

FIG. 2 shows the hydraulic unit of the rescue tool of FIG. 1 in a perspective view;

FIG. 3 shows the hydraulic unit of FIG. 2 in sub-sectional view;

FIG. 4*a-d* shows an embodiment of a disc-shaped motor, as installed in the hydraulic unit of FIG. 2;

FIG. 5 shows a simplified half-section of a first embodiment of a fastening between a disc-shaped motor and the hydraulic tank of the hydraulic unit;

FIG. 6 shows a simplified half-section of another embodiment of a fastening between a disc-shaped motor and the hydraulic tank of the hydraulic unit.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 shows in plan view an embodiment of a hydraulic spreading tool, as it is often used to recover people from accident vehicles. Such a tool is also used for other enforced or spreading operations. In addition to the illustrated spreading tool, cutting tools are known to belong to the same generic group of tools. As a superordinate, such tools can be referred to as hydraulic rescue tools 1.

The apparatus designated in its entirety as a rescue tool 1 in FIG. 1 essentially comprises a hydraulic unit 2 and a hydraulically actuated or controllably actuated tool 3 attached thereto in the form of the said spreading device, cutting device, lifting device or the like. According to the example, the mechanical-hydraulic tool 3 is coupled to the hydraulic unit 2 via a mechanical-hydraulic interface 4, as can also be seen in FIG. 2. This coupling is preferably a fixed or permanent coupling, which can only be disengaged with the aid of tools or only by dismantling operations. Alternatively, a tool-free activatable and deactivatable interface is possible, but measures are provided to avoid the loss of hydraulic fluid or to avoid inclusions of air in the hydraulic circuit between the hydraulic tool 3 and the hydraulic unit 2.

An overall length 5 of the rescue tool 1 is made up of the length 6 of the hydraulic unit 2 and the length 7 of the hydraulic tool 3. Hereby, the length 7 of the hydraulic tool 3 is typically greater than the length 6 of the hydraulic aggregate 2. While the length 7 of the hydraulic tool 3 is essentially influenced by its performance or robustness, for example, due to lever transmissions or the underlying lever rules, the length 6 of the hydraulic unit 2 is not necessarily in interdependency with its performance. Accordingly, the handling or ergonomics of the rescue tool 1 can be improved in particular by the shortest possible constructive lengths of the hydraulic unit 2, without causing any loss of performance, in particular with respect to the mechanical pressure or cutting forces of the tool 3. Therefore, the present solution is based on being able to design the hydraulic unit 2 with the shortest possible length 6, without affecting the performance of the rescue tool 1 or without affecting the performance of the hydraulic unit 2.

The spreading tool 3 shown by way of example comprises two spreading arms 8, 9, which are hinged to a base body 10 and can perform opening and closing movement via a hydraulic cylinder, not shown. At least one handle 11, 12 provided for the most ergonomic and secure guiding or holding of the rescue tool 1 by a rescuer is advantageously formed on the base body 10 of the tool 3.

A housing 13 of the hydraulic unit 2, which preferably consists of plastic, may also have at least one handle 14 for the most ergonomic support or handling of the rescue tool 1. The portable and network-independent rescue tool 1, in particular its hydraulic unit 2, has at least one electromechanical interface 15, which is provided for on-demand coupling and decoupling of at least one battery pack 16, as this was exemplified in FIGS. 2, 3. In the properly attached or plugged-in state, as can be seen in FIGS. 2, 3, the at least one battery pack 16 is provided for the electrical power supply of the hydraulic rescue tool 1.

As can be seen above all from a summary of FIGS. 2, 3, the portable, battery-operated hydraulic unit 2 comprises an electric motor 17, which can be driven by the electrical energy of the battery pack 16, for driving a hydraulic pump 18 of the hydraulic unit 2. According to the invention, this electric motor 17 is formed by a disc-shaped motor 19. Such a disc-shaped motor 19 has an axial length 22 extending in parallel to the longitudinal axis 20 of its output shaft 21, which is smaller or shorter than an outer diameter 23 of the disc-shaped motor 19, as shown in FIG. 3 or FIG. 4*d*. In particular, such disc-shaped motors 19 have a relatively large ratio between outer diameter 23 and axial length 22 compared to conventional electric motors. Typically, this ratio between the outer diameter 23 of the utilized disc-shaped motor 19 and its axial length 22 is larger than 1, in particular greater than 1.5. In accordance with a practicable design, this ratio is approximately 2.

Preferably, the disc-shaped motor 19 is connected directly that is without an intermediate gearbox to the hydraulic pump 18 in a rotationally movable manner. To this end, a drive shaft 24 of the hydraulic pump 18, the drive shaft 24 being, for example, designed as a hollow shaft, is non-rotatably connected to the output shaft 21 of the disc-shaped motor 19. The hydraulic pump 18 serves as a high-pressure pump for hydraulic fluids, in particular for hydraulic oil, and may be formed, for example, by an eccentric pump or the like. A hydraulic tank 25, which is provided for storing or receiving a sufficient amount of hydraulic fluid, and in particular for supplying the hydraulic tools 3 with the working medium, is positioned between the disc-shaped motor 19 and the hydraulic pump 18 in relation to the longitudinal axis of the hydraulic rescue tool 1. In other words, in relation to the longitudinal direction of rescue tool 1, at the opposite ends of hydraulic tank 25, the hydraulic pump 18 is located directly adjacent to the hydraulic tank 25 on one hand and on the other hand the disc-shaped motor 19 is located directly adjacent to the hydraulic tank 25. Preferably, the hydraulic tank 25 defines the central holding or fastening element for the disc-shaped motor 19 on the one hand and for the hydraulic pump 18 that is on the opposite site on the other hand.

In order to enable a position-independent operation of the hydraulic unit 2 or of the rescue tool 1, the hydraulic tank 25 is assigned a compensation device 26 for hydraulic fluid, in particular arranged within the hydraulic tank 25. As is well known, such a compensation device 26 typically includes an elastically resilient or elastically adjustable balancing diaphragm 27 disposed within the hydraulic tank 25 and movable relative to the interior of the hydraulic tank 25 depending on the volume of hydraulic fluid in the hydraulic tank 25. As a result, elastically variable volumes are created within the hydraulic tank 25, which prevent an undesired discharge of hydraulic fluid from vents during the filling and discharge operations of hydraulic fluid with respect to the hydraulic tank 25.

For manually controlled influencing of opening and closing movements or of ejection and retraction movements of the tool 3, at least one manually operated hydraulic control valve 28—FIG. 3—is provided on the hydraulic unit 2. This hydraulic control valve 28 can be transferred by at least one actuating element 29, for example, a rocker switch, to the respective valve positions, in particular to alternating flow and blocking positions. Typically, the at least one actuating element 29 changes piston or shutter slide positions in the control valve 28. The hydraulic pressure which can be generated via the hydraulic pump 18 can thereby be supplied in a controlled manner via the control valve 28 and via fluid passages 30 of the hydraulic unit 2 to a hydraulic cylinder of the tool 3 (not shown) or can be returned therefrom.

FIGS. 4*a* to 4*d* illustrate an advantageous embodiment of a disc-shaped motor 19 for driving the hydraulic pump 18 of the hydraulic unit 2.

This disc-shaped motor 19 is designed as a so-called external rotor motor. That is, it has an at least partially internal, fixed stator 31, which is at least partially surrounded by an external, rotationally movable rotor 32, as best seen in FIG. 4*d*. The output shaft 21 of the disc-shaped motor 19 which is formed or mounted on the rotationally movable rotor 32 passes through its stator 31 with respect to the axial direction or longitudinal axis 20 of its output shaft 21. It is appropriate in this context if the disc-shaped motor 19 is designed as a so-called bell rotor motor which in cross-section has a substantially bell-shaped or substantially U-shaped rotor 32. The substantially hollow-cylindrical shell portion of the rotor 32 surrounds the cylindrical shell surface or outer contour of the stator 31, as best seen in FIGS. 4*a-d.*

According to an advantageous embodiment, the disc-shaped motor 19 has a plurality of distributed permanent magnets 33 with respect to the circumference or with respect to the circumferential direction of the rotor 32. This plurality of permanent magnets 33 on the rotor 32 are in this case interacting with excitation or coil windings (not shown) on the stator 31. The coil windings (not shown), which are associated with the pole shoes of the stator 31 shown in FIGS. 4*a*, 4*b* and 4*c*, serve to generate electromagnetic rotating fields, thereby determining the respective rotational speed and direction of rotation of the disk-shaped motor 19. As is known per se, these rotary fields or the corresponding three-phase currents are generated by an electronic commutation circuit 34 shown schematically in FIG. 3. The disc-shaped motor 19 is thus designed preferably brushless or without sliding contacts and is therefore of very low maintenance.

As best seen in FIG. 3 it can be provided according to an appropriate embodiment that the disc-shaped motor 19 is attached to the preferably metallic housing 35 of the hydraulic tank 25. According to a typical embodiment, a separate holding plate 36 can be provided thereby, which is screwed to the disc-shaped motor 19 on the one hand and on the other hand is connected to the housing 35 of the hydraulic tank 25, in particular positively-locked and/or screwed, as can be best seen in FIG. 3. The holding plate 36 acts as a separate adapter or coupling element between the disc-shaped motor 19 and the housing 35 of the hydraulic tank 25. According to a preferred development or improvement, however, it is provided that the disc-shaped motor 19 is directly attached to the housing of the hydraulic tank 25, that is it is mounted without an intermediate adapter or holding plate 36, as can be seen in FIGS. 5, 6. This results in further weight savings and advantages in terms of minimizing the required number of components.

In particular, as best seen in FIGS. 5, 6, it can be provided that the first end wall 37 of the disc-shaped motor 19, which is closest to the output shaft 21, can be firmly screwed to the housing 35 of the hydraulic tank 25. This first end wall 37 of the disc-shaped motor 19 is a constituent of the stator 31 and is thus penetrated by the output shaft 21 of the disc-shaped motor 19, as can be seen schematically in FIGS. 5 and 6. Preferably, several fastening screws 38 distributed over the circumference or around the output shaft 21 are provided, which serve to connect the disc-shaped motor 19 or its stator 31 with the hydraulic tank 25. It is appropriate if the screw connection between the disc-shaped motor 19 and the housing 35 of the hydraulic tank 25 is mounted or is provided starting from the second end wall 39 of the disc-shaped motor 19 opposite the first end wall 37. In this context, screw heads 40 of the fastening screws 38 for the disc-shaped motor 19 are then arranged on the inside 41 of the first end wall 37 facing the interior or the inside of the disc-shaped motor 19. This makes it possible to avoid the need for additional adapter or retaining plates to connect the disc-shaped motor 19 to the hydraulic tank 25.

Figure 4A:
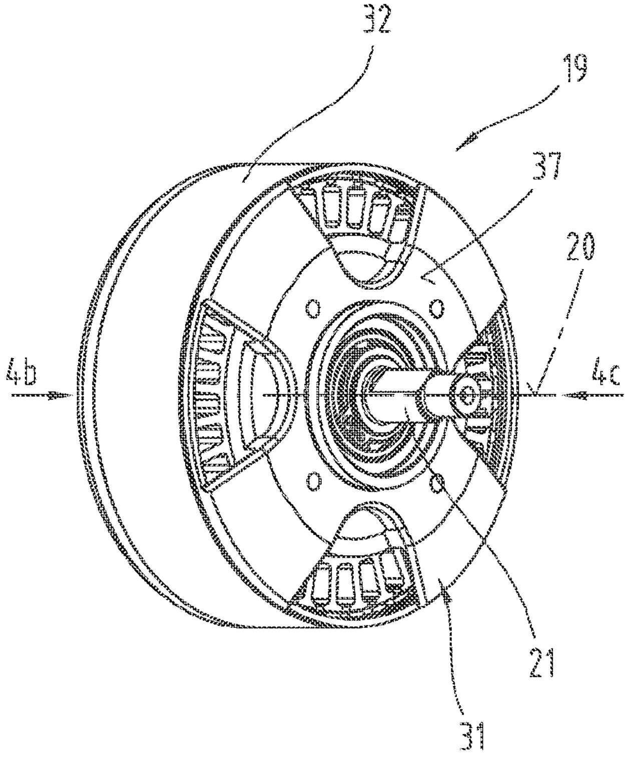
Figure 4B:
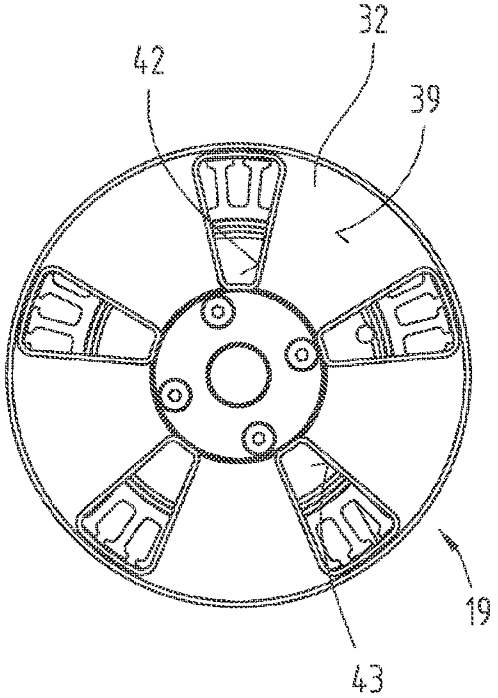
Figure 4C:
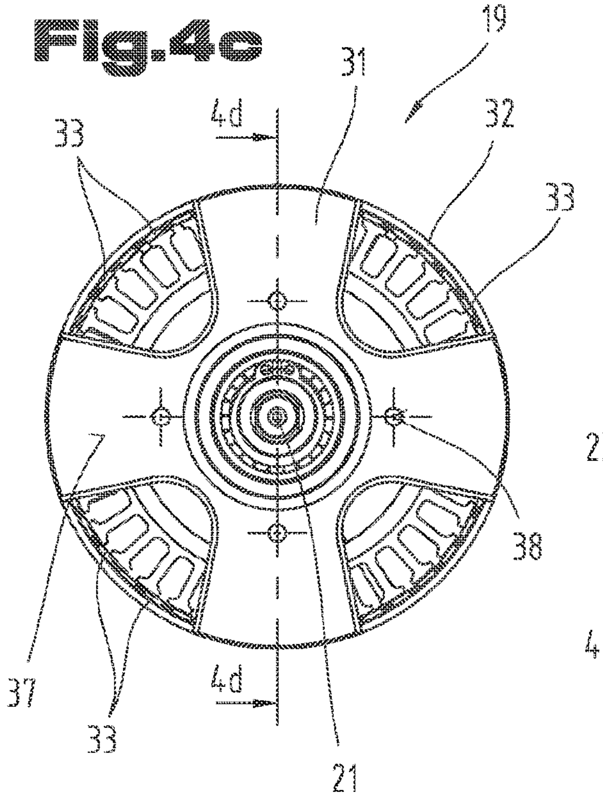
Figure 4D:
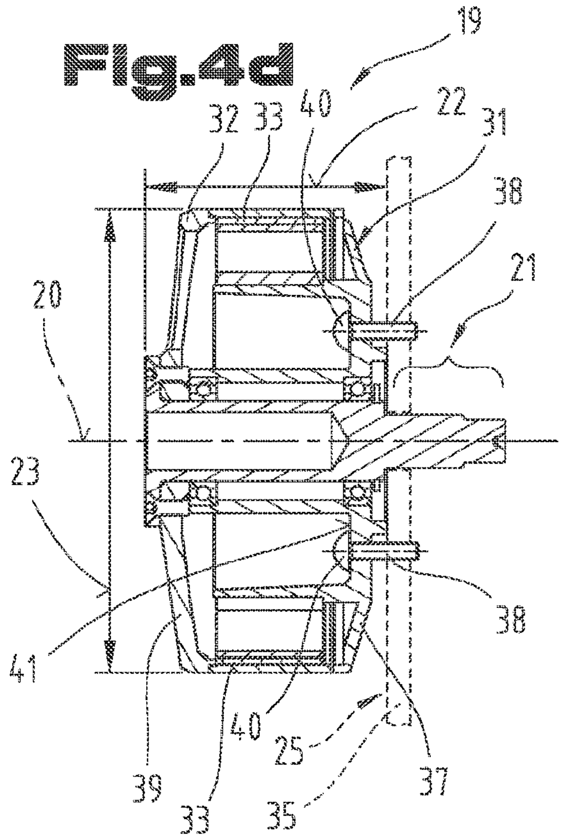

In order to enable this screw connection of the disc-shaped motor 19 through its interior, without having to disassemble the disc-shaped motor 19 into individual parts, it is provided that the second end wall 39 of the disc-shaped motor 19 opposite the first end wall 37, which second end wall 39 is a constituent of the rotor 32, has at least two breakthroughs 41, 42, in particular at least two diametrically opposite breakthroughs 41, 42 or corresponding cutouts, as can also be seen from FIG. 4*b*. These at least two breakthroughs 41, 42 or corresponding cutouts in the second end wall 39 of the disc-shaped motor 19 are provided for insertion of the fastening screws 38, starting from the second end wall 39 in the direction parallel to the output shaft 21. In particular, the fastening screws 38 can be inserted into the interior of the disc-shaped motor 19 via these breakthroughs 41, 42 and ultimately abut on the inside 41 of the first end wall 37 in a load-transmitting manner, as can be seen in FIGS. 4 *d*, 5 and 6.

As best seen in FIG. 5, the first end wall 37, which functions as a constituent of the stator 31, can also be designed as a boundary wall or as a sub-section of the hydraulic tank 25.

On the other hand, according to FIG. 6, a split design of the first end wall 37 is provided, which forms a positive-locking motor flange in order to be able to couple this disc-shaped motor 19 with the hydraulic tank 25 in a centered manner.

As further best seen in FIGS. 5, 6, it can also be appropriate if at least one sub-section or individual zones of the first end wall 37 of the disc-shaped motor 19 forms a boundary section of the hydraulic tank 25. In particular, the first end wall 37 of the disc-shaped motor 19 can thereby define at least one sub-section of the cover or another boundary wall of the housing 35 of the hydraulic tank 25. In context of the compensation device 26 or the corresponding compensation diaphragm 27—FIG. 3—it is not absolutely necessary that the transition between the disc-shaped motor 19 or between the first end wall 37 and the housing 35 of the hydraulic tank 25 is made liquid-tight. The tightness with respect to the hydraulic fluid kept in stock is ensured in a simple manner by the compensation membrane 27, as shown by way of example in FIG. 3.

The embodiments show possible design variants and it should be pointed out at this stage that the invention is not limited to the specifically illustrated embodiments thereof, and instead the individual variants may be used in different combinations with one another and these possible variants lie within the reach of the person skilled in this technical field given the disclosed technical teaching.

The scope of protection is determined by the claims. However, the description and drawings shall be used for the interpretation of the claims. Individual features or combinations of features from the various embodiments shown and described may be inventive solutions in their own right. The task on which the independent inventive solutions are based can be found in the description For the sake of order, it should finally be pointed out that, for a better understanding of the structure, elements are illustrated to a certain extent out of scale and/or on an enlarged scale and/or on a reduced scale.

Although only a few embodiments of the present invention have been shown and described, it is to be understood that many changes and modifications may be made thereunto without departing from the spirit and scope of the invention.

REFERENCE LIST

1 Rescue Tool
2 hydraulic unit
3 tool
4 mechanical-hydraulic interface
5 Overall Length
6 Length
7 Length
8 Spreading Arm
9 Spreading Arm
10 Base
11 Handle
12 Handle
13 Housing
14 Handle
15 Electromechanical Interface
16 Battery Pack
17 Electric Motor
18 Hydraulic Pump
19 Disc-shaped motor
20 Longitudinal Axis
21 Output Shaft
22 Axial Length
23 Outer Diameter
24 Drive Shaft
25 Hydraulic Tank
26 Compensation Device
27 Compensation Membrane
28 Control Valve
29 Actuating Element
30 Fluid Channel
31 Stator
32 Rotor
33 Permanent Magnet
34 Commutation Circuit
35 Housing
36 Holding Plate
37 First End Wall
38 Fastening Screw
39 Second End Wall
40 Screw Head
41 Inside
42 Breakthrough
43 Breakthrough

What is claimed is:

1. A portable, battery-powered hydraulic power unit for hydraulic rescue tools, comprising:
- a hydraulic pump;
- a housing including a hydraulic fluid cavity;
- a manually operated hydraulic control valve;
- an electromechanical interface for coupling and decoupling of a battery;
- a mechanical-hydraulic interface for connecting to a hydraulic tool; and
- an electric motor for driving the hydraulic pump;
- wherein the electric motor includes an output shaft, a fixed stator, and a rotationally movable rotor extending at least partially around the stator;
- wherein an outer diameter of the electric motor is greater than an axial length of the electric motor extending parallel to a longitudinal axis of the output shaft; and
- wherein the output shaft is connected to the rotor and extends through the stator in an axial direction of the output shaft.

2. The hydraulic unit according to claim 1, wherein at least a portion of the hydraulic pump extends into the housing.

3. The hydraulic unit according to claim 1, further comprising a hydraulic tank including the housing.

4. The hydraulic unit according to claim 1, wherein an end wall of the electric motor is directly connected to the housing via a plurality of fastening screws.

5. The hydraulic unit according to claim 1, wherein:
- a first end of the housing is directly connected to an end wall of the electric motor; and
- a second end of the housing, which is disposed opposite the first end of the housing, is connected to the hydraulic pump.

6. The hydraulic unit according to claim 5, wherein:
- the housing includes (i) an axial boundary wall and (ii) at least one side wall extending transversely to the boundary wall and surrounding the hydraulic fluid cavity; and
- the end wall of the electric motor is connected to the boundary wall.

7. The hydraulic unit according to claim 6, wherein the end wall of the electric motor is disposed outside of the housing and the hydraulic fluid cavity.

8. The hydraulic unit according to claim 1, wherein at least a portion of the stator is connected to the housing.

9. A portable hydraulic rescue tool operable by a single user, comprising:
- the hydraulic unit according to claim 1; and
- a hydraulic tool attached to the hydraulic unit.

10. A portable, battery-powered hydraulic power unit for hydraulic rescue tools, comprising:
- a hydraulic pump;
- a housing including a hydraulic fluid cavity;
- a manually operated hydraulic control valve;
- an electromechanical interface for coupling and decoupling of a battery;
- a mechanical-hydraulic interface for connecting to a hydraulic tool; and
- an electric motor for driving the hydraulic pump, the electric motor including (i) an end wall and (ii) an output shaft projecting from the end wall;
- wherein an axial length of the electric motor is shorter than an outer diameter of the electric motor;
- wherein the housing is disposed between the hydraulic pump and the electric motor; and
- wherein the end wall of the electric motor is connected to the housing.

11. The hydraulic unit according to claim 10, further comprising a plurality of fastening screws directly connecting the end wall of the electric motor to the housing.

12. The hydraulic unit according to claim 10, wherein:
- a first end of the housing is connected to the end wall of the electric motor; and
- a second end of the housing, which is disposed opposite the first end of the housing, is connected to the hydraulic pump.

13. The hydraulic unit according to claim 10, wherein at least a portion of the hydraulic pump extends into the housing.

14. The hydraulic unit according to claim 10, wherein:
- the electric motor has (i) a first end defined by the end wall and (ii) a second end disposed opposite the first end; and
- the axial length of the electric motor is defined by and between the first end and the second end of the electric motor.

15. The hydraulic unit according to claim 10, wherein the end wall of the electric motor is disposed outside of the housing.

16. The hydraulic unit according to claim 10, wherein:
- the electric motor includes a rotor and a stator; and
- the end wall of the electric motor is a constituent of the stator.

17. The hydraulic unit according to claim 10, wherein:
- the housing includes an axial boundary wall; and
- the end wall of the electric motor is connected to the boundary wall.

18. A portable hydraulic rescue tool operable by a single user, comprising:
- the hydraulic unit according to claim 10; and
- a hydraulic tool attached to the hydraulic unit.

19. A portable hydraulic rescue tool operable by a single user, comprising a hydraulic tool and a hydraulic unit connected to the hydraulic tool, wherein:
- the hydraulic unit includes:
  - a housing including a hydraulic fluid cavity;
  - a hydraulic pump for moving hydraulic fluid between the housing and the hydraulic tool;
  - a manually operated hydraulic control valve;
  - an electromechanical interface for coupling and decoupling of a battery;
  - a mechanical-hydraulic interface connecting the hydraulic unit to the hydraulic tool; and
  - an electric motor for driving the hydraulic pump, the electric motor including (i) an end wall disposed outside of the housing and (ii) an output shaft projecting axially from the end wall;
- the electric motor has:
  - a first end defined by the end wall;
  - a second end disposed opposite the first end;
  - an axial length defined between the first end and the second end; and
  - an outer diameter that is larger than the axial length;
- a first end of the housing is connected to the end wall of the electric motor via a plurality of fastening screws;
- a second end of the housing, which is disposed opposite the first end of the housing, is connected to the hydraulic pump; and
- at least a portion of the hydraulic pump projects into the housing.

20. The portable hydraulic rescue tool according to claim 19, wherein the hydraulic tool is one of:
- a spreading tool;
- a cutting tool; and
- a lifting tool.

* * * * *